(12) United States Patent
Durig et al.

(10) Patent No.: US 7,789,365 B2
(45) Date of Patent: Sep. 7, 2010

(54) GRID-HOLDING ELEMENT

(75) Inventors: Markus Durig, Gaschurn (AT); Thomas Foser, Balzers (LI)

(73) Assignee: Hilti Aktiengesellschaft, Schaan, Liechtenstein ( * ) Notice: Subject to any disclaimer, the term of this patent is extended or adjusted under 35 U.S.C. 154(b) by 365 days.

(21) Appl. No.: 11/483,352

(22) Filed: Jul. 7, 2006

(65) Prior Publication Data

US 2007/0012852 A1 Jan. 18, 2007

(30) Foreign Application Priority Data

Jul. 12, 2005 (DE) .................. 10 2005 000 087

(51) Int. Cl.
*A47F 5/00* (2006.01)
*A47H 1/10* (2006.01)

(52) U.S. Cl. .............. 248/300; 248/301; 248/304; 248/339; 248/547; 248/215

(58) Field of Classification Search ............. 248/300, 248/301, 304, 339, 547, 215
See application file for complete search history.

(56) References Cited

U.S. PATENT DOCUMENTS

| | | | | | |
|---|---|---|---|---|---|
| 2,482,697 | A | * | 9/1949 | Spreen | 220/776 |
| 4,362,422 | A | * | 12/1982 | Zinkann et al. | 403/387 |
| 5,364,051 | A | * | 11/1994 | Philpot | 248/229.26 |
| 5,522,187 | A | * | 6/1996 | Bogaerts | 52/90.1 |
| 5,885,024 | A | * | 3/1999 | Zupan et al. | 403/389 |
| 5,975,477 | A | * | 11/1999 | Spitler | 248/342 |
| 6,360,507 | B1 | * | 3/2002 | Nevers et al. | 52/506.07 |
| 6,482,018 | B1 | * | 11/2002 | Stekelenburg | 439/111 |
| 6,536,729 | B1 | * | 3/2003 | Haddock | 248/300 |
| 6,585,448 | B2 | * | 7/2003 | Grossman et al. | 403/403 |
| 6,886,790 | B2 | * | 5/2005 | Soyris | 248/200 |
| 6,886,799 | B2 | * | 5/2005 | Yamanashi | 248/610 |
| 6,913,236 | B2 | * | 7/2005 | Weyandt | 248/300 |
| 7,104,022 | B2 | * | 9/2006 | Burgess | 52/702 |
| 7,299,593 | B1 | * | 11/2007 | diGirolamo et al. | 52/241 |
| 2007/0075213 | A1 | * | 4/2007 | Foser et al. | 248/547 |

* cited by examiner

*Primary Examiner*—J. Allen Shriver, II
*Assistant Examiner*—Michael McDuffie
(74) *Attorney, Agent, or Firm*—Abelman, Frayne & Schwab

(57) ABSTRACT

A grid holding element has a first leg (11) at least one free end of which is hook-shaped, and a second leg (12) having a saddle-shaped attachment section (20) in which a through-opening (23) through which a fastening element (30) is extendable, is formed, a first foot section (2) that projects from the attachment section in a direction away from the first leg (11), and a second foot section (22) adjoining the first leg (11), with a maximal extension length (D1) of the first foot section (21) in a direction perpendicular to a plane (E) defined by the attachment section (20), being greater than a maximal extension length (D2) of the second foot section (22) in the direction perpendicular to the plane (E).

9 Claims, 2 Drawing Sheets

GRID-HOLDING ELEMENT

BACKGROUND OF THE INVENTION

1. Field of the Invention

The present invention relates to a grid-holding element having a first leg at least one free end of which is hook-shaped and a second leg having an attachment section provided with a through-opening through which a fastening element such as, e.g., nail or bolt, is extendable.

2. Description of the Prior Art

U.S. Pat. No. 5,118,147 discloses a grid-holding element of the type described above and the hook-shaped end of which engages a support, and the end of which remote from the hook-shaped end has an engagement area for a screw. The screw connects the holding element with a plate-shaped element that lies on a grid which is secured to the support upon tightening the holding element.

The drawbacks of the holding element of U.S. Pat. No. 5,118,147 consists in that it can only be used with a plate-shaped element as a counter-support, and it cannot be directly mounted, e.g., using a hand-held setting tool.

U.S. Pat. No. 4,703,883 discloses a holding element having two legs. The first leg has a U-shaped channel in the bottom of which an opening is formed through which a fastening element can extend. The second leg is flat and has a second opening. This holding element can be secured with a fastening element that extends through the opening in the bottom of the U-shaped channel, to a constructional component by using a hand-held setting tool.

The drawback of the holding element of U.S. Pat. No. 4,703,833 consists in that it is impossible to secure a grid to a support or constructional component, without using some auxiliary means.

Accordingly, an object of the invention is a holding element in which the drawbacks of prior art holding elements are eliminated and which can be easily mounted using a setting tool.

SUMMARY OF THE INVENTION

This and other objects of the present invention, which will become apparent hereinafter, are achieved by providing a holding element with a saddle-shaped attachment section having a first foot section that projects from the attachment section in a direction away from the first leg, and a second foot section adjoining the first leg. The first foot section has a maximal extension length, in a direction perpendicular to a plane defined by the attachment section, greater than a maximal extension length of the second foot section in the direction perpendicular to the plane.

The foregoing novel features of the present invention insure that the holding element can easily be secured on a support with a setting tool and that the holding element height has a certain tolerance range. At the same time, any auxiliary elements become unnecessary.

Advantageously, the difference between the maximal extension length of the first foot section and the maximal extension length of the second foot section is at least 1 mm. This difference provides for an adequate tolerance range with regard to the holding element height.

Preferably, the difference between the maximal extension lengths in the direction perpendicular to the plane of the attachment section, of the first and second foot sections amounts from 1.5 mm to 5 mm, which insures a comfortable tolerance range.

Advantageously, the first leg has a first surface section and at least one second surface section forming an angle with the first surface section, a bending axis between the two surface sections extends transverse to a longitudinal extent of the first leg. The angle between the surface sections can be acute or obtuse. As a result, both surface section act as a springy hinge, with surface sections pulling away form each other under a heavy load. This further increases the tolerance range, without increasing the height difference between the two foot sections of the attachment section. An optimal shape of the holding element is achieved when the angle between two surface sections amounts from 125° to 150°.

Instead of two surface sections, the holding element can have three and more surface sections with an increased number of hinge points.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
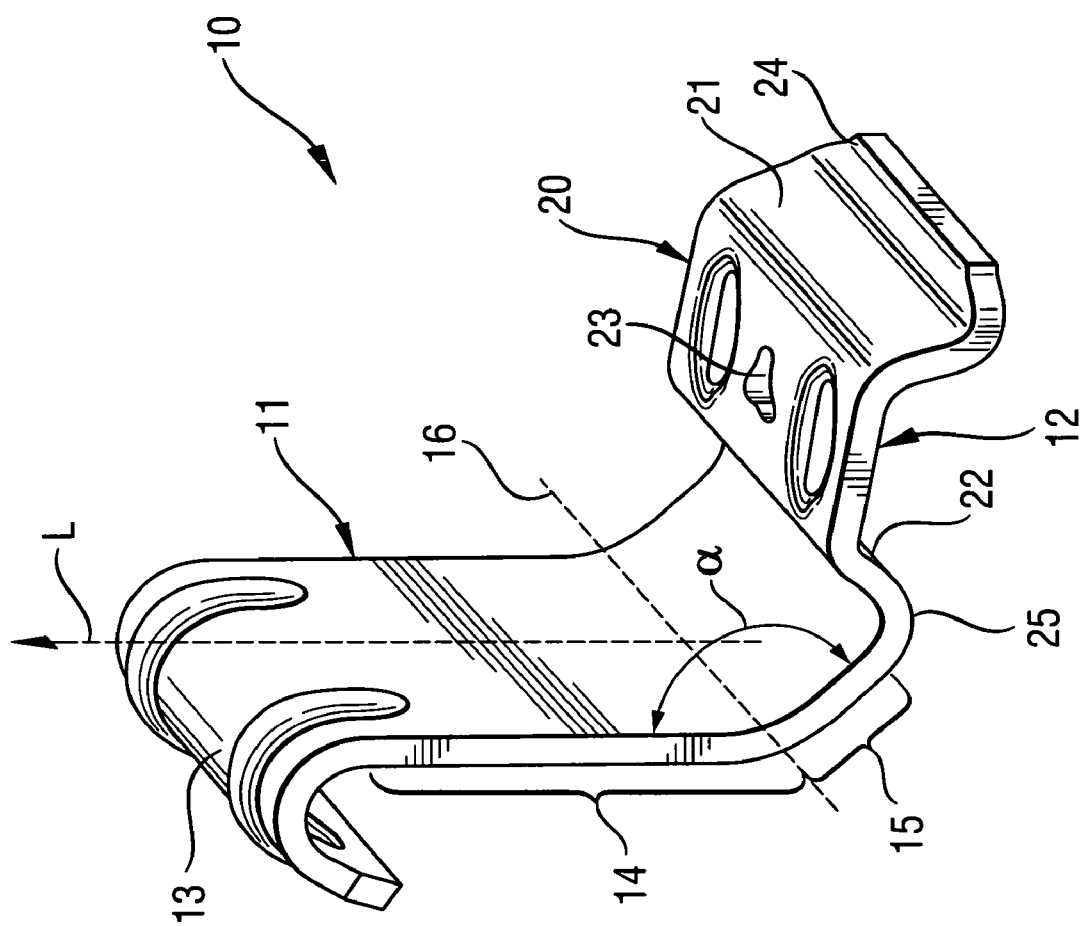
FIG. 1 a perspective view of a grid-holding element according to the present invention.
Figure 2:
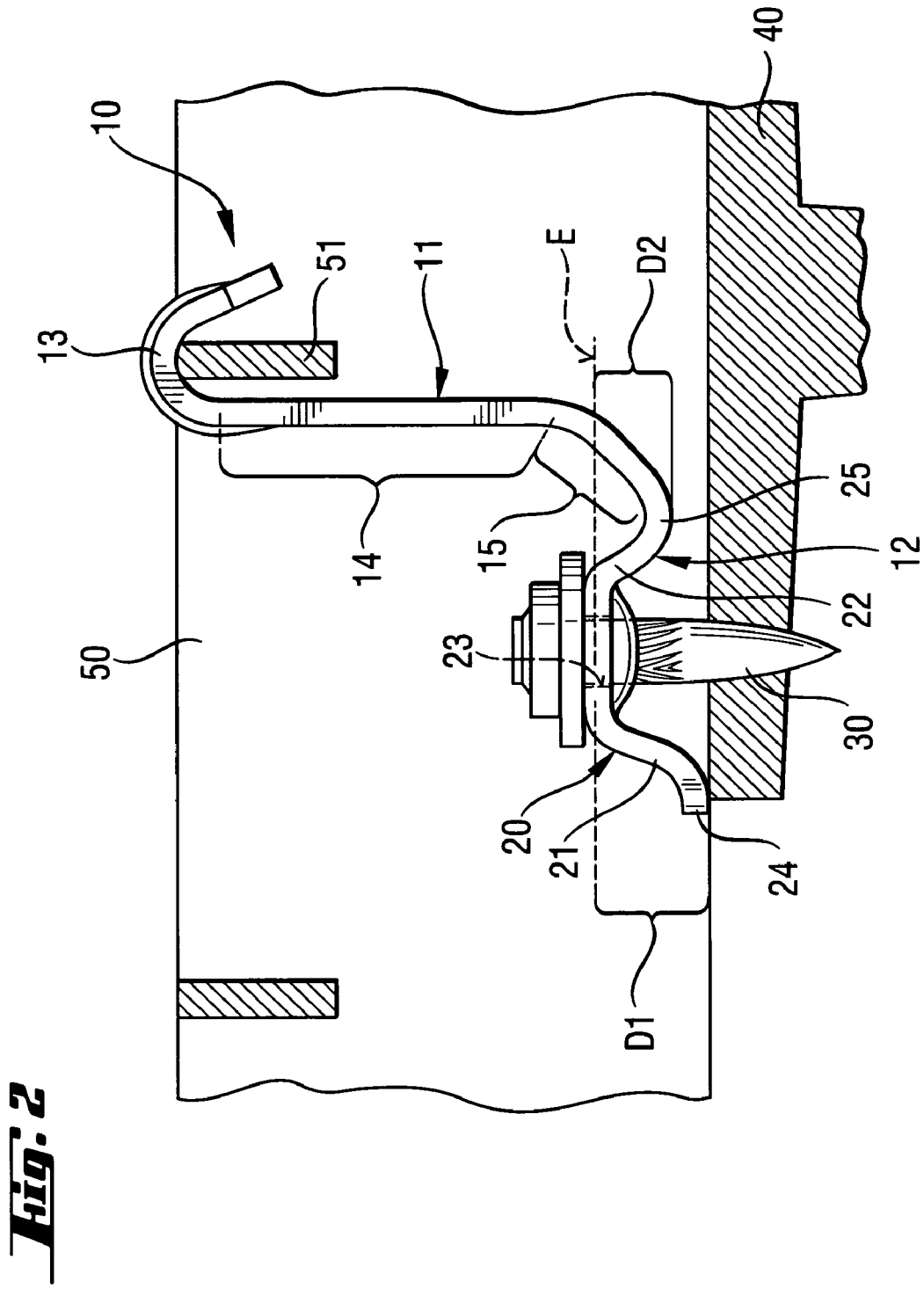
FIG. 2 a side view of a grid-holding element according to the present invention in a condition in which the holding element is secured on a support.

A grid-holding element 10 according to the present invention, which is shown in FIGS. 1-2, has a first leg 11 and a second leg 12 which are arranged approximately at a right angle to each other. The first leg 11 has a hook-shaped free upper end 13 for engaging around a strut 51 of a grid 50 or another element to-be-secured on a support 40. The first leg 11 further has first and second surface sections 14 and 15 that extend to each other in the initial, not secured position of the holding element 10, at an angle α of about 138°. However, in the embodiment shown in the drawings and having two surface sections 14, 15, a greater or smaller angle α that can vary in a range from 125° to 150° can be provided. The first leg 11 extends substantially in a longitudinal direction L that is directed substantially perpendicular to a bending axis 16 along which both surface sections 14, 15 abut each other.

The second leg 12 forms a saddle-shaped attachment section 20 that has a through-opening 23 for a fastening element 30 which can be driven in a constructional component such as, e.g., support 40, shown in FIG. 2, with a setting tool (not shown). Two foot sections 21, 22 project sidewise of the attachment section 20. The first foot section 21 is bent outwardly at its end region 24 to form a bearing region for abutting the constructional component or the support 40. The second foot section 22 is likewise bent outwardly at its end region remote from the attachment section 20, with the bend 25 passing directly into the first leg 11 of the holding element 10.

The maximal extension length D1 of the first foot section 21 in the direction perpendicular to a plane E defined by the attachment section 20 is greater than the maximal extension length D2 of the second foot section 22 in the direction perpendicular to plane E. As a result, as shown in FIG. 2, upon mounting of the holding element 10 for securing the grid 50 or another part on the support 40, in an ideal case, only the end region 24 of the first foot section 21 lies on the support 40. Reverse bending of the first leg 11, as a result of contact of the bend 25 with the support 40, is thereby prevented or takes place so late in the setting process that the hook-shaped end 13 cannot any more slip off the strut 51. In the disclosed embodiment, the holding element 10 is immune to height changes. In the disclosed embodiment, in which the difference of the maximal extension lengths D1 and D2 amounts to about 2 mm, a tolerance of about ±2-4 mm is acceptable. Due to geometry of the first leg 21, with the surface sections 14, 15 forming an angle of about from 125° to 150°, the height tolerance is further improved.

Instead of a single hook-shaped end, the first leg 11 can have, e.g., two hook-shaped ends arranged relative to each other at a right angle.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A grid-holding element, comprising a first leg (11); and a second leg (12) connected with the first leg (11) and having a saddle-shaped attachment section (20) having a through-opening (23) through which a fastening element (30) is extendable, a first foot section (21) that projects from the attachment section in a direction away from the first leg (11), and a second foot section (22) adjoining the first leg (11) at one end of the first leg (12), the first leg (11) having at least one other, hook-shaped end remote from the one end and extending from a plane defined by the first leg in a direction opposite a direction the second foot section (22) extends from the plane defined by the first leg, wherein the first foot section (21) has a maximal extension length (D1), in a direction perpendicular to a plane (E) defined by the attachment section (20), greater than a maximal extension length (D2) of the second foot section (22) in the direction perpendicular to the plane (E).

2. A grid-holding element according to claim 1, wherein difference between the maximal extension length (D1) of the first foot section (21) and the maximal extension length (D2) of the second foot section (22) amounts to from 1.5 mm to 5 mm.

3. A grid-holding element according to claim 1, wherein the first leg (11) has a first surface section (14) and at least one second surface section (15) forming an angle ($\alpha$) with the first surface (14), and wherein a bending axis (16) between two surface sections (14, 15) extends transverse to a longitudinal extent (L) of the first leg (11).

4. A grid-holding element according to claim 3, wherein the first and second surface sections (14, 15) of the first leg (11) are planar.

5. A grid-holding element according to claim 4, wherein the angle ($\alpha$) between the first and second surface sections (14, 15) amounts from 125° to 150°.

6. A grid-holding element, comprising a first leg (11) having at least one free, hook-shaped end; and a second leg (12) having a saddle-shaped attachment section (20) having a through-opening (23) for receiving a fastening element (30) extendable therethrough for securing the grid-holding element to a support (40), a first foot section (21) that projects from the attachment section in a direction away from the first leg (11), and a second foot section (22) adjoining the first leg (11), the first foot section (21) having a maximal extension length (D1), in a direction perpendicular to a plane (E) defined by the attachment section (20), greater than a maximal extension length (D2) of the second foot section (22) in the direction perpendicular to the plane (E), wherein the first foot section (21) has an outwardly bent end region (24) that forms a bearing region for abutting the support (40).

7. A grid-holding element according to claim 6, wherein the outwardly bent end region (24) of the first foot section (21) extends in a direction opposite a direction in which the second foot section (22) extends.

8. A grid-holding element for securing a grid (50) having a plurality of struts (51) to a substantially flat support (40), the grid holding element (10), comprising a first leg (11) at least one free end of which is hook-shaped for engaging around a strut (51); and a second leg (12) having a saddle-shaped attachment section (20) having a through-opening (23) through which a fastening element (30) is extendable, a first foot section (21) that projects from the attachment section in a direction away from the first leg (11), and a second foot section (22) adjoining the first leg (11), the first foot section (21) having a maximal extension length (D1), in a direction perpendicular to a plane (E) defined by the attachment section (20), greater than a maximal extension length (D2) of the second foot section (22) in the direction perpendicular to the plane (E), wherein the first leg (11) has a first surface section (14) and at least one second surface section (15) forming an angle ($\alpha$) with the first surface section (14), and wherein a bending axis (16) between two surface sections (14, 15) extends transverse to a longitudinal extent (L) of the first leg (11), and wherein the first and second surface sections (14, 15) of the first leg (11) are planar.

9. A grid-holding element according to claim 8, wherein the angle ($\alpha$) between the first and second surface sections (14, 15) amounts from 125° to 150°.

* * * * *